July 4, 1961 C. GOODMAN 2,991,364
WELL LOGGING
Filed July 8, 1954 2 Sheets-Sheet 1

*INVENTOR.*
CLARK GOODMAN
BY Robert Hockfield
HIS ATTORNEY

July 4, 1961   C. GOODMAN   2,991,364
WELL LOGGING
Filed July 8, 1954   2 Sheets-Sheet 2

*INVENTOR.*
CLARK GOODMAN
BY Robert Hockfield
HIS ATTORNEY

United States Patent Office 2,991,364
Patented July 4, 1961

2,991,364
WELL LOGGING
Clark Goodman, Boston, Mass., assignor, by mesne assignments, to Schlumberger Well Surveying Corporation, Houston, Tex., a corporation of Texas
Filed July 8, 1954, Ser. No. 441,976
24 Claims. (Cl. 250—83.3)

This invention relates to well logging and, more particularly, pertains to new and improved methods and apparatus for deriving a log of nuclear phenomena induced in earth formations irradiated by neutrons.

Conventional neutron logging methods, in general, are limited to the detection of compounds of hydrogen in earth formations and usually cannot distinguish the hydrocarbons being sought from connate waters. Obviously, information denoting the hydrocarbons more specifically, either directly or by indirect means employing an indicator element which usually accompanies hydrocarbons in a formation, is of great interest.

It is an object of the present invention, therefore, to provide new and improved radioactivity logging methods and apparatus for deriving more information concerning earth formations traversed by a well or borehole than heretofore possible.

Another object of the present invention is to provide new and improved methods and apparatus for radioactivity well logging by which specific elements may be identified in situ.

Yet another object of the present invention is to provide new and improved methods and apparatus for radioactivity well logging particularly useful in the location of hydrocarbon-bearing formations.

In accordance with the method of exploring or logging earth formations traversed by a borehole embodying the present invention, earth formations are irradiated with neutrons during repetitive, relatively short intervals of time thereby to define successive operating cycles, each including an irradiation interval followed by a quiescent interval. Each quiescent interval is comprised of a first period wherein the neutrons from the source may slow down, diffuse and experience capture reactions with nuclei in atoms of the formations and a second period wherein radioactive elements formed by neutron interactions may exhibit a product of radioactive decay. Indications are obtained of a nuclear phenomenon occurring during repetitive, relatively short observation intervals, each occurring within a portion of an operating cycle including an aforesaid irradiation interval and the first period.

According to a particular embodiment of the invention, the observation intervals are coincident with or closely spaced to the irradiation intervals, and thus indications are obtained of inelastic scattering of neutrons by nuclei of atoms in the formations. In this case, gamma radiation is detected which occurs when a neutron leaves a product nucleus in an excited state from which it promptly decays to a ground state.

In another embodiment of the invention, each observation interval occurs during a portion of the first period of an operating cycle wherein neutrons slow down. The observation intervals may be fixed in timing relative to the irradiation intervals and indications may be obtained of the flux of neutrons having an energy slightly greater than a thermal level at which such neutrons may start to diffuse. Alternatively, the observation intervals may be of varied timing relative to the irradiation intervals and indications may be obtained of the timing at which maximum neutron flux occurs.

According to still another embodiment of the invention, each observation interval occurs at or in the vicinity of the end of the first period of an operating cycle and gamma radiation resulting from the prompt decay of compound nuclei to a ground state, after neutron capture, may be observed. The observation intervals may be fixed in timing relative to the irradiation intervals and the flux of capture gamma radiation is indicated, or the timing of the observation intervals may be varied and indications are obtained of the timing at which maximum capture gamma radiation occurs.

Further definition of elements may be obtained through the use of another feature of the present invention wherein gamma radiation of one or more predetermined energy levels is indicated.

It is also within the contemplation of the present invention to provide apparatus for carrying out those embodiments of the present invention wherein indications are obtained of the timing of the irradiation intervals relative to the observation intervals at which a selected nuclear phenomenon occurs. To this end, apparatus for deriving a log of earth formations traversed by a borehole is comprised of a source of neutrons of controllable flux and means for controlling the source so as to derive short pulses of neutrons. The apparatus further comprises a detection system responsive to a nuclear phenomenon resulting from irradiation of the earth formations by the neutron pulses. The detection system is effectively disabled and is operatively conditioned during observation intervals, timed relative to the neutron pulses by an adjustable amount. Means are provided for adjusting the timing of the observation intervals and for providing indications of the timing relationship of the observation intervals relative to the neutron pulses.

The novel features of the present invention are set forth with particularity in the appended claims. The present invention, both as to its organization and manner of operation, together with further objects and advantages thereof, may best be understood by reference to the following description taken in connection with the accompanying drawings in which:

Figures 1, 2, 3:
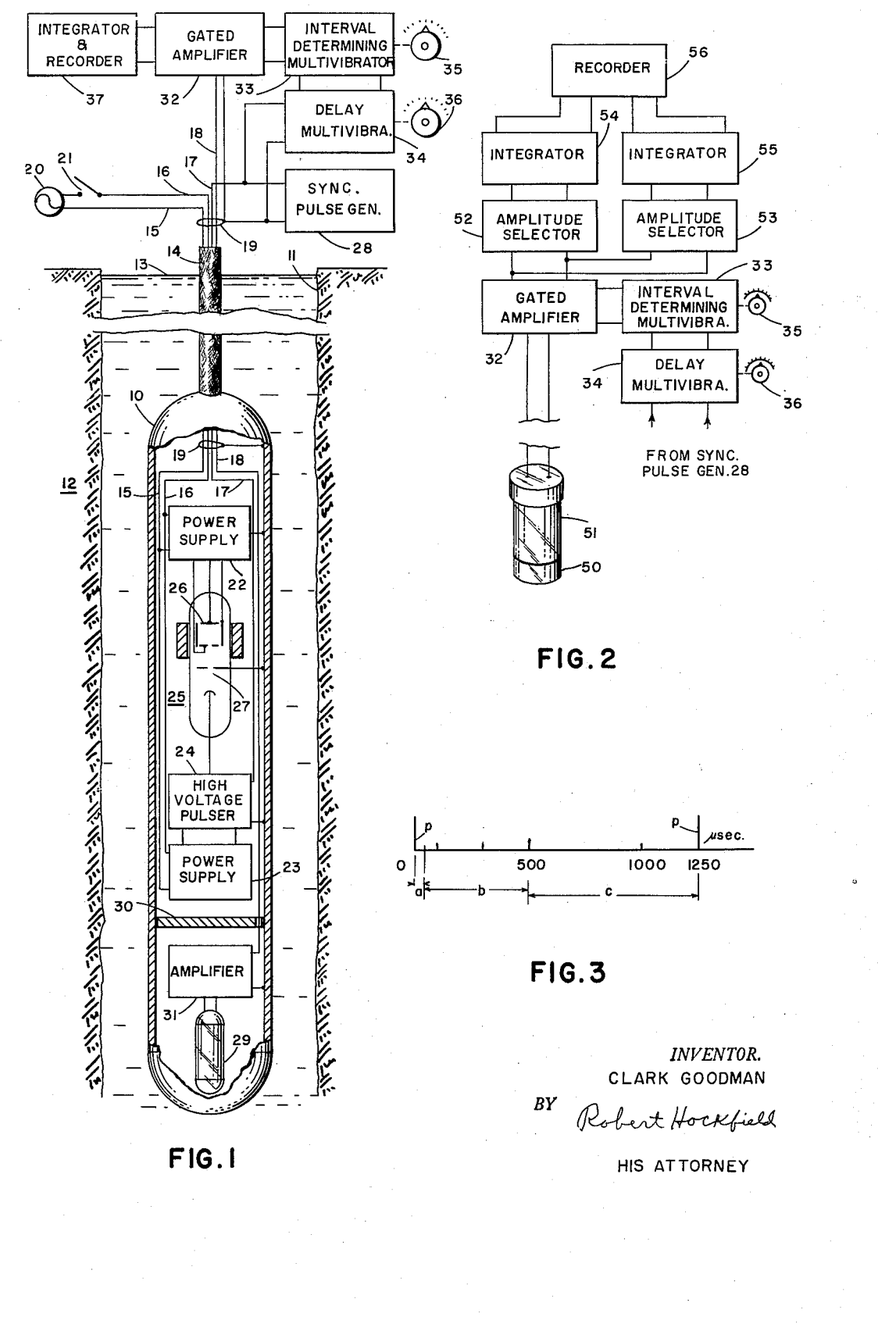
FIG. 1 is a view in longitudinal cross section of apparatus adapted to be lowered into a bore hole for carrying out the method of exploring earth formations in accordance with the present invention.
FIG. 2 is a schematic diagram of a modification which may be made to the apparatus of FIG. 1 whereby another aspect of the invention may be carried out.
FIG. 3 is a time diagram useful in explaining various embodiments of the invention.

To carry out the method embodying the present invention, apparatus of the type illustrated in FIG. 1 may be employed. As there shown, this apparatus comprises a pressure-resistant housing 10 adapted to be passed through a borehole 11 traversing a plurality of earth formations 12. Borehole 11 usually contains a hydrogenous drilling fluid 13, such as a water base or oil base mud, and it may be lined with one or more strings of metallic casing (not shown) or it may be uncased as illustrated.

Housing 10 is suspended in the borehole by means of an armored cable 14 which, in connection with a winch (not shown) located at the surface of the earth, may be employed to lower and raise the housing in the borehole in the customary manner.

Cable 14 also includes a plurality of insulated conductors 15, 16, 17 and 18 and a shield 19 (which may be the armor of the cable) utilized to connect surface equipment with components within the housing 10. Of these, conductors 15 and 16 connects a source of alternating current 20 provided with an operating switch 21 to a power supply 22 and to a power supply 23, in turn, connected to a high voltage pulser 24 which may be of conventional construction. For example, pulser 24 may include a circuit arrangement shown at pages 367–371 of Radar System Engineering by Ridenour, designated volume 1 of the Radiation Laboratory Series and published by McGraw-Hill Book Company in 1947. If needed, the pulser may include a suitable step-up transformer so as to develop peak pulse voltages of the order of 100 kilovolts.

Also included within housing 10 is a neutron generator 25 which may be like the one disclosed in the copending application of Clark Goodman, filed March 11, 1952, bearing the Serial No. 275,932 and assigned to the same assignee as the present invention or, as illustrated, may be of the type disclosed in the copending application of J. T. Dewan, filed April 9, 1953, bearing the Serial No. 281,378 and assigned to the present assignee. Thus, neutron generator 25 comprises an ion source 26 energized by power supply 22 and an accelerating gap 27 energized by pulser 24. Source 26 and gap 27 are enclosed by an envelope filled with deuterium gas. The accelerating gap is provided with a tritium target if 14 mev. neutrons are desired. Of course, deuterium may be employed if neutrons at approximately 3.5 mev. are required.

Pulser 24 preferably is of the type which is normally in a quiescent state during which no pulse is produced. However, it is triggered or operatively conditioned in response to each of the pulses supplied by a synchronizing pulse generator 28 via conductor 17 and shield 19 of cable 14. The duration and repetition rate of the synchronizing pulses will be defined in detail hereinafter in describing various embodiments of the method of logging in accordance with the invention. In general, these pulses are relatively short in duration relative to the periods between pulses so that neutron generator 25, under the control of pulser 24, produces neutrons during relatively short intervals of time and earth formations 12 are thus irradiated with "pulses" of neutrons.

If desired, the neutron output may be monitored and the peaks maintained relatively constant by means of a monitoring and control system such as described in the copending application of Wayne R. Arnold, filed March 8, 1954, bearing the Serial No. 414,761, now U.S. Patent 2,914,677, issued November 24, 1959, and assigned to the same assignee as the present invention.

As a result of neutron irradiation, a nuclear phenomenon occurs in formation material and, for example, resulting gamma radiation may be returned toward housing 10. Some of this radiation is intercepted by a radioactivity responsive device or detector 29 supported at the lower end of the housing below a suitable shield plate 30 designed to shield the detector from a selected type of radiation that might emanate from generator 25. Detector 29, for example, may be a suitably energized Geiger-Müller tube coupled to an amplifier 31 connected via lead 18 and shield 19 to a conventional gated amplifier 32 at the surface of the earth.

Amplifier 32 is normally inoperative to translate the pulse signal supplied by amplifier 31 and is operatively conditioned in response to each pulse produced by a conventional interval-determining multivibrator 33. Multivibrator 33 is coupled to a conventional delay multivibrator 34, in turn, coupled to synchronizing pulse generator 28. Multivibrators 33 and 34 are provided with respective controls, illustrated schematically by dash lines 35 and 36 for adjusting the duration of pulses applied to amplifier 32, and the time at which each of these pulses is generated relative to a synchronizing pulse. The settings of controls 35 and 36 will be apparent from the description of the method embodying the invention to be presented hereinafter.

Amplifier 32 is coupled to an integrator and recorder unit 37 which, for example, may comprise a capacitor for deriving a potential representing the number of pulses applied per unit time and a recording voltmeter to which this potential is applied. The recording medium of the voltmeter is displaced in a customary manner in proportion to movement of housing 10 through the borehole so that a continuous log of counting rate versus depth in the borehole may be obtained.

If desired, unit 37 may comprise a pulse normalizer in which pulses of predetermined width and height are derived coupled to a conventional counting rate meter which develops an output which is a function of the average number of pulses per unit time.

In operation, housing 10 is lowered into borehole 11 and switch 21 is closed. Power supplies 22 and 23 thus are energized thereby supplying power to ion source 26 of neutron generator 25 and to pulser 24, respectively. Deuterium ions are drived in ion source 26 and some of these enter accelerating gap 27. Each time a pulse from generator 28 activates pulser 24, a high voltage is applied to the accelerating gap 27 and highly accelerated deuterium ions react with tritium in the target portion of the gap to produce neutrons at an energy level of 14 mev. Accordingly, earth formations 12 are irradiated with neutrons during repetitive, relatively short intervals of time thereby to define successive operating intervals, each including irradiation interval followed by a quiescent interval.

As will be described hereinafter in greater detail, each quiescent interval is comprised of a first period wherein neutrons may slow down, diffuse and experience capture reactions with nuclei in atoms of the formations and a second period wherein radioactive elements formed by neutron interactions may exhibit a product of radioactive decay. In the aforementioned Goodman application, indications are obtained of a nuclear phenomenon occurring in the second period. However, according to the present invention, controls 35 and 36 are adjusted so that the pulses developed by multivibrator 33 operatively condition the gated amplifier 32 during observation intervals, each occurring within a portion of an operating cycle including an irradiation interval and the first period. Thus, of the resulting gamma radiation incident on detector 29 and producing pulses amplified in amplifier 31, only that portion within each observation interval is translated to unit 37 and logged as a function of the depth of housing 10 in borehole 11.

As pointed out earlier, where deuterium-deuterium or deuterium-tritium reactions occur in the neutron generator, monoenergetic neutrons at 3.5 mev. and 14 mev., respectively, are derived. Such neutrons are classified as fast neutrons; i.e. having an energy level greater than 1 mev.

The speed V of these neutrons may be defined as follows:

$$V = \sqrt{\frac{2E}{m}} \quad (1)$$

where $m$=the mass of a neutron and E is the neutron energy. It is thus possible to compute V for any energy, using the value $1.7 \times 10^{-24}$ grams for the mass of the neutron and a conversion factor of $1.6 \times 10^{-12}$ ergs per electron volt. Accordingly, the following values may be obtained:

Table I

| Energy in electron volts: | Velocity in centimeters/second |
|---|---|
| 10 mev. | $4.4 \times 10^9$ |
| 1 mev. | $1.4 \times 10^9$ |
| 0.1 mev. | $4.4 \times 10^8$ |
| 10 ev. | $4.4 \times 10^6$ |
| 1 ev. | $1.4 \times 10^6$ |
| 0.1 ev. | $4.4 \times 10^5$ |

Since the mean-free-path, or average distance travelled before collision, of fast neutrons in the range from 0.1 to 10 mev., is only about 10 cm. in earth formations, the first one or two collisions occur within $10^{-8}$ to $10^{-9}$ seconds following emission of the fast neutron. If these are elastic collisions, there is no detectable resulting nuclear phenomenon. However, an appreciable number of the first few collisions are inelastic in nature, in which case, gamma rays are emitted within $10^{-12}$ seconds, or essentially simultaneously with such inelastic collisions. In this process, a neutron of a given energy strikes the nucleus of an atom of atomic weight A to produce a compound nucleus, and an atom of atomic weight A+1 in an excited state is formed. Almost instantaneously, a neutron of an energy lower than the given energy is ejected and gamma radiation is emitted as the atom returns to the ground state of atomic weight A. As will be more apparent from the ensuing discussion, the present invention makes use of such prompt gamma radiation in deriving a log of the earth formations traversed by a borehole.

Of the various elements in the formations traversed by a borehole which might cause such inelastic collisions, two of great interest are carbon (in oil and limestone) and oxygen (in water and in most rocks). Gamma radiation resulting from inelastic scattering of neutrons may have initial energies corresponding to transitions between low-lying energy levels of a nucleus which is struck. For example, carbon of atomic weight 12 has levels at 4.43, 7.5 and 9.61 mev. above the ground state and of these, it has been found that the dominant inelastic gamma radiation is at an energy level of 4.43 mev. On the other hand, oxygen of atomic weight 16 has levels at 6.05, 6.13, 6.9 and 7.1 mev. above the ground state. It has been found that the dominant inelastic gamma radiation from this element is at energy levels of 6.9 and 7.1 mev.

Of course, the dominant inelastic gamma radiation ascribed to carbon and oxygen may not be excited as a result of irradiation with moderately fast neutrons (below 4.4 mev.). However, neutrons derived from deuterium-tritium interactions could excite both carbon 12 and oxygen 16 and the resulting inelastic gamma radiation could be detected by conventional scintillation spectrometer apparatus such as will be later described.

Thus, in accordance with one embodiment of the present invention, neutron generator 25 irradiates the earth formations 12 with neutrons having a selected energy during relatively short time-spaced intervals. These intervals may be a microsecond or so in duration and spaced from one another by a quiescent interval of the order of 1250 microseconds. Gated amplifier 32 is operatively conditioned substantially only during a short interval coincident with or very closely spaced to the interval of neutron irradiation. For example, the detector system may be made responsive only during neutron irradiation and for a few microseconds thereafter. In this way, inelastic gamma radiation which occurs promptly with the formation of compound nuclei and which appears essentially simultaneously with neutron emission is detected to the exclusion of nuclear phenomenon taking place in the following period in which neutrons slow down and diffuse in the formations. The resulting pulses are indicative of inelastic gamma radiation and thus recorder 37 provides an indication of the gamma radiation due to inelastic scattering as a function of depth in the borehole.

By employing a conventional scintillation spectrometer, such as shown in FIG. 2, for detecting inelastic gamma radiation, the characteristics of the earth formations may be further distinguished. For example, in place of Geiger tube 29, a sodium iodide crystal 50 optically coupled to a photomultiplier tube 51 is provided. The output of photomultiplier 51 may be amplified, if desired, and supplied to gated amplifier 32. The output of amplifier 32 is supplied to each of a pair of amplitude selectors 52, 53 coupled to respective integrators 54, 55. The integrators are coupled to a recording voltmeter 56 provided with respective recording channels but having a common recording medium. Although but two amplitude selector-integrator channels have been illustrated, obviously any desired number may be employed.

As is well-known, gamma radiation incident on scintillation element 50 produces pulses of light energy which are converted to electrical pulses by photomultiplier 51. The amplitudes of the resulting pulses are dependent upon the energy of corresponding gamma radiation and thus by adjusting the amplitude selectors 52 and 53, pulses representing respective bands of gamma ray energies are supplied to integrators 54 and 55, respectively, and an individual record for the pulse rate in each band is derived by recorder 56.

Specifically, amplitude-selective channels 52, 54 may be arranged to be responsive to gamma radiation at 4.4 mev. and channel 53, 55 may be responsive to 6.9 and 7.1 mev. In this way, carbon and oxygen may be clearly denoted on the resulting log. For these gamma ray energies, the photoelectric absorption in a scintillation crystal, such as sodium iodide, is small. Hence, it may be desirable to set the pulse height analyzer for either the Compton peak, which is quite broad, or on the pair-production peak which occurs at 1.02 mev. below the energy of the gamma radiation to be measured.

Moreover, by correlating the carbon and oxygen information with hydrogen information obtained through conventional neutron-neutron or neutron-gamma logging techniques adapted to detect hydrogen, the presence of carbon with hydrogen, as distinct from oxygen, may be uniquely determined. It is, therefore, evident that the well logging method embodying the present invention is particularly adapted to distinguish hydrocarbons from water and provides more information concerning the earth formations than heretofore possible.

Heavier elements, in general, have lower first excited states. Accordingly, they result in lower energy, less penetrating gamma rays. For example, $Fe^{56}$ at 0.85 mev., $Al^{27}$ at 0.84 mev., W at 0.101 to 0.124 mev., $Ta^{181}$ at 0.136 mev. and U at ~0.05 mev. produce this result. Under some conditions, such as in ascertaining the clay or shale content of sandstones or limestones, it may be of interest to measure the yield of 0.85 and 0.84 mev. gamma rays from iron and aluminum together as an indication of the clay or shale. In this case, it is preferable to set the pulse height analyzer on the photoelectric peak from the scintillation crystal. Furthermore, these low-lying levels may be excited by much lower energy neutrons, for example, as obtained from a generator producing neutrons at a level of 3.5 mev. from deuterium-deuterium reactions.

The foregoing description of one embodiment of the present invention illustrates the manner in which the nuclear phenomenon resulting from a particular event in the life of a neutron introduced into earth formations may be employed in a method of well logging.

In accordance with other embodiments of the invention, nuclear phenomena resulting from different specific events may be utilized in well logging. The time relationship of these events may best be appreciated by enumerating various experiences in the life of a neutron.

Upon its introduction into an earth formation, a neutron may experience inelastic collision, as described hereinbefore, or elastic collision. In the case of inelastic collision, the nucleus of an atom is struck and a neutron is ejected with an energy substantially less than the energy of the initial neutron. After an elastic collision, with the nucleus of an atom, the same neutron in effect "bounces off" with an attendant fractional energy loss which is on the average approximately inversely proportional to the mass of the struck nucleus. In either case, on the average the resultant neutron exhibits a net reduction in energy, and after a number of collisions neutrons are slowed down to thermal energies. The major time required to complete this slowing down process is occupied in making collisions at low velocities. It may be shown that the mean slowing down time, $\bar{\theta}$, of neutrons from an energy $E_o$ to an energy $E_t$ (thermal energy) is:

$$\bar{\theta} = \frac{2\lambda_s}{\xi V_t} \quad (2)$$

where $\lambda_s$ is the scattering mean free path, or the reciprocal of the quantity, $N_s \sigma_s$ (the macroscopic elastic scattering cross section of a medium for neutrons of energy E, between $E_o$ and $E_t$); $\xi$ is the mean logarithmic energy loss of a neutron in an elastic collision; and $V_t$ is the velocity of a neutron at energy $E_t$ (which may be calculated from Equation 1 above).

Using published data for the quantity $\xi$ and for the scattering mean free path, $\lambda_s$, for the various elements of water, sand and limestone, the following values for $\bar{\theta}$ in microseconds may be obtained from Equation 2 for various percentages of water and based on a value for $E_t$ of 1 electron volt:

Table II

|  | Percent H₂O | | | | |
|---|---|---|---|---|---|
|  | 0 | 2 | 20-25 | 38.8 | 100 |
| Sand | 48 | 23 | 3.5 | 2.3 | 0.9 |
| Limestone | 45 | 21 | 4.4 |  | 0.9 |

(All values represent slowing down times in microseconds.)

As seen from Table II, the mean slowing down time $\bar{\theta}$ is not appreciably different for sand and limestone. However, below about 20% H₂O, $\bar{\theta}$ is dependent to a great extent on the water content which, in turn, depends upon the porosity of the media.

Following the slowing down interval, neutron diffusion occurs. That is, a neutron may undergo one or more collisions with the nuclei of atoms and, on the average, experiences no change in energy. At some time during such diffusion, a collision occurs wherein the neutron is captured in the nucleus of an atom to form a compound nucleus and its journey comes to an end. The resulting atom is in an excited state and essentially instantaneously returns to a ground state with the prompt emission of gamma radiation which thus provides a means for indicating the occurrence of this event.

Neutron capture may also produce a relatively unstable radioactive element from which gamma radiation is emitted during a decay process to a stable element. The latter type of gamma radiation exhibits a characteristic reduction in intensity with time representative of the decay process and is further distinguished in that it occurs subsequent to the emission of capture gamma radiation.

To determine the timing of capture gamma radiation, it may be shown that the average time, $T_c$, a neutron lives from the inception of the diffusion period is:

$$T_c = \frac{1}{N_c \sigma_c V} \quad (3)$$

where $N_c$ is the concentration of capturing nuclei in atoms/cm.³, $\sigma_c$ is the capture cross section in barns, and V is the neutron velocity (which may be calculated from Equation 1.

The following table gives values of $T_c$ in microseconds for the full range of concentrations ($N_c$ in atoms/cm.³ $\times 10^{-24}$)

and cross sections (in barns) of interest in well logging:

Table III

| $\sigma_c$ | $N_c$ | | |
|---|---|---|---|
|  | 0.1 | 0.01 | .001 |
| .01 | 4.5×10⁴ | 4.5×10⁵ |  |
| 1.0 | 4,500 | 4.5×10⁴ | 4.5×10⁵ |
| 10 | 450 | 4,500 | 4.5×10⁴ |
| 100 | 45 | 450 | 4,500 |
| 1,000 | 4.5 | 45 | 450 |

(All values represent $T_c$ in microseconds.)

From Table III it is apparent that except for unusual formation conditions, the diffusion time $T_c$ is substantially longer than the slowing down time (Table II). Therefore, in most formations the diffusion time primarily determines the time of neutron capture. From Tables II and III it may be seen that the total time, slowing down plus diffusion, in general should be expected to be in the range from 50 to 500 microseconds following the introduction of a neutron into an earth formation.

The foregoing timing relationship in the life of a neutron may be best appreciated from the time diagram of FIG. 3. As there shown, neutrons are emitted during the short repetitive intervals illustrated as pulses $p$ spaced in time by approximately 1250 microseconds. Inelastic collisions may occur during irradiation intervals $p$ and neutron slowing down may occur in the portion $a$, about 50 microseconds in duration, i.e. the first period in the quiescent interval between pulses $p$. In the following portion $b$ of the first period extending from 50 to 500 microseconds on the time scale, diffusion occurs and a neutron may be captured. Finally, in the second period $c$ decay products of radioactive elements formed by neutron capture may be exhibited.

Although discrete boundaries have been shown for the various time periods $a$, $b$ and $c$, these are merely illustrative of an assumed average; in practice, these periods may not exhibit sharp boundaries.

Figure 4:
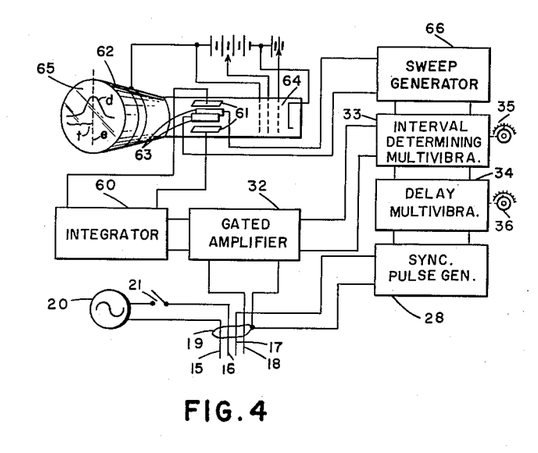
FIG. 4 is a schematic diagram of a modification which may be made to the apparatus of FIG. 1 in accordance with the instant invention.

The apparatus of FIG. 1 may be modified in the manner shown in FIG. 4 so that various timing relationships in the life of a neutron may be indicated. The output of gated amplifier 32 is coupled to an integrator 60 having a relatively short time constant, in turn, coupled to vertical deflection plates 61 of a conventional cathode ray tube 62 having horizontal deflection plates 63. Plates 61 and 63 control the position of the electron beam projection by an electron gun 64 toward a fluorescent viewing screen 65 in a known manner. A sweep or sawtooth generator 66 is coupled to horizontal deflection plates 63 and is supplied with the pulses produced by multivibrator 33. Thus, each sawtooth is initiated by the leading edge of each pulse derived by multivibrator 33 and is terminated at the trailing edge. If desired, a conventional blanking circuit may be employed so that a visible trace is developed on screen 65 only in the presence of a sweep voltage from generator 66.

To utilize the apparatus of FIG. 1, as modified in FIG. 4, for measuring neutron slowing down times, detector 29 may be enclosed by a resonance absorbing element. For example, indium may be employed which reacts with incident neutrons having a particular energy of 1.44 electron volts (ev.) to produce capture gamma rays which activate the detector. Neutrons at other energies produce substantially no response. Of course, other energies may be attained with different enclosures, for example, silver has a resonance at 5.3 ev., cadmium has one at 0.17 ev., uranium has one at 7 ev. and iodine at 35 ev.

Figure 5:
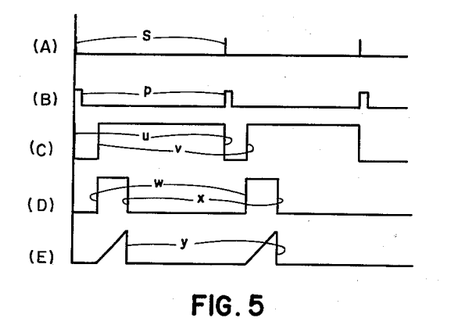
FIG. 5 is a time diagram illustrating various wave forms useful in explaining the operation of the apparatus of FIG. 4.

The manner in which the circuit of FIG. 4 is adjusted for operation may be best appreciated by reference to the time diagram of FIG. 5. As shown in FIG. 5(A), repetitive synchronizing pulses *s* are developed by generator 28 and the corresponding neutron pulses *p* are synchronized with pulses *s*, as shown in FIG. 5(B). Also concomitant with pulses *s* are the edges *u* of the square waves, represented in FIG. 5(C) which are developed by multivibrator 34. The edges *v* occur at a time which may be adjusted by control 36 to correspond approximately to the beginning of interval *a* (FIG. 3).

The edges *w* of the square waves developed by multivibrator 33, shown in FIG. 5(D) are concomitant with the edges *v* of the pulses in FIG. 5(C) and their edges *x* may be adjusted by control 35 so that each of the gating pulses terminates at the end of an interval *a* (FIG. 3). As shown in FIG. 5(E), the timing of the sawtooth wave developed by sweep generator 66 corresponds to the square wave of multivibrator 33.

In operation, neutron pulses emitted by generator 25 irradiate formations 12 and some of these are slowed almost to thermal energy. Those having an energy of 1.44 ev. which are intercepted by the indium covered detector produce pulses which are supplied via amplifier 32 to integrator 60.

A horizontal sweep on viewing screen 65 is initiated approximately at the termination of an irradiation interval and pulses derived by detector 29 and occurring during the sweep interval are integrated and displayed at a vertical deflection on screen 65. The display thus includes a curve *d* representing the time distribution of pulses resulting from resonance capture of neutrons slowed to the selected energy level. By constructing a vertical dash line *e* through the peak of curve *d*, the time *t* of the peak may be determined.

By continuously measuring time *t* as the housing 10 traverses borehole 11, the slowing down characteristics of the formations may be determined.

Figure 6:
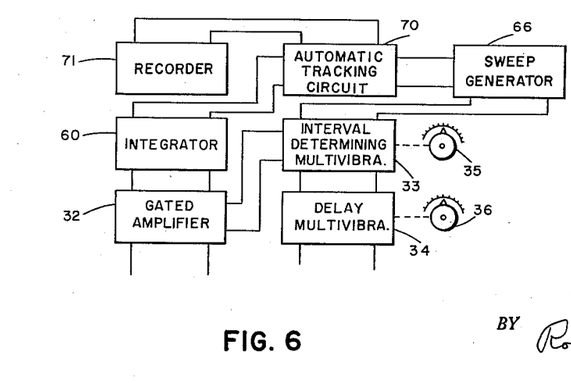
FIG. 6 represents a modification which may be incorporated in the arrangement of FIG. 4.

This type of measurement may be obtained automatically by employing the circuit modification of FIG. 6. Integrator 60 and sweep generator 66 are coupled to a conventional radar-type automatic tracking circuit 70 which develops a voltage representing the timing of the peak of distribution of the pulses relative to a reference. For example, device 70 may comprise a time selection circuit of the type described at page 321 etc. of "Electronic Time Measurements" by Chance, Hulsizer, MacNichol and Williams, vol. 20 of the Radiation Laboratory Series, published by McGraw-Hill Book Company in 1949. The derived voltage is supplied to a recorder 71 where it is recorded as a function of the depth of housing 10 in borehole 11.

The apparatus of FIG. 1 may be employed for obtaining indications of slowed neutrons without making time measurements. For example, controls 35 and 36 of multivibrators 33 and 34 may be adjusted so that amplifier 32 is operatively conditioned during a short interval, say a few microseconds, just prior to the end of interval *a* (FIG. 3). Neutrons incident on the indium enclosed detector produce pulses which occur at varying rates relative to the selected observation interval in dependence on neutron slowing down characteristics of the formations. Thus, a voltage is developed and recorded as an indication of such characteristics. Of course, the observation intervals may occur at any desired portion of interval *a*.

The apparatus of FIG. 1 may also be employed to measure capture gamma radiation which occurs after neutron diffusion and at a time within interval *b* (FIG. 3). Thus, in accordance with another embodiment of the present invention the neutron generator 25 is adjusted to irradiate earth formations with neutrons during intervals of the order of 50 microseconds time-spaced by approximately 1200 microseconds. By suitably adjusting controls 35 and 36, gated amplifier 32 is operatively conditioned for a few microseconds at a selected time between 50 and 500 microseconds after the generation of a pulse of neutrons. Preferably the observation intervals are appropriately positioned in time interval *b* so that they occur to one side of the peak of the distribution of pulses expected in this interval. By means of this type of adjustment, the indicator system responds substantially only to the gamma radiation emitted promptly relative to the formation of compound nuclei through neutron capture and does not respond to delayed gamma radiation resulting from the decay of a radioactive element.

For example, to distinguish between oil and salt water in a limestone bed of approximately 20% porosity, it is first assumed that optimum conditions exist; i.e. there is no drilling fluid in the borehole or casing and that there is a high salt content homogeneously distributed through the formations (10% NaCl by volume in the brine). The slowing down time for either oil or salt water is nearly the same, i.e. it may be in the neighborhood of 5 microseconds. The diffusion time is somewhat more than a factor of 2 greater in oil-bearing limestone than in brine-bearing limestone; i.e. 425 and 185 microseconds, respectively. By properly adjusting timing of the detector, it may be possible to distinguish between these two formations. For example, a neutron burst of between 20 to 40 microseconds may be employed and delay times of 200 and 400 microseconds for the detector may be employed, the detector being operatively conditioned after each delay time for an interval in the neighborhood of a few microseconds.

The arrangements of either FIG. 4 or 6 for measuring the timing of a distribution of pulses may be utilized to determine the timing of capture gamma radiation relative to the neutron irradiation intervals. The manner in which this may be accomplished is believed to be evident from the discussion presented earlier, however, instead of operating in interval *a* illustrated in FIG. 3, the pertinent portions of the circuit are arranged to operate in interval *b*.

In addition, spectral analysis may be employed together with the just-described delayed coincidence method of detecting gamma radiation occurring promptly on capture of neutrons.

In accordance with yet another embodiment of the invention, detector 29 is sensitive to thermal neutrons, for example the detector may be a boron-trifluoride-filled ionization chamber. The various methods outlined hereinbefore may be employed for measuring a characteristic of the resulting thermal neutrons. Thus, the time in the diffusion period wherein a maximum rate in the distribution of pulses due to thermal neutrons may be measured as an indication of earth formation characteristics.

It may be appropriate to point out that the neutron generator 25 may be operated so as to produce very high yields of neutrons during a relatively short interval in which it is operatively conditioned in the carrying out of the method according to the present invention. For example, a peak pulse current of 1 to 10 milliamperes in the accelerating gap 27 of the generator may be attained where one microsecond neutron pulses are spaced by 1250 microseconds. If longer pulses and/or shorter spacings are desired, the peak current and resulting neutron yield should be proportionately decreased with such an increase in duty cycle in order to avoid overheating and depletion of the target. In general, for inelastic gamma ray logging, since short duration pulses may be employed, a much higher peak neutron yield may be attained than in the other methods.

If desired, the ion source 26 of the neutron generator may be modulated so that it is operative only during the production of pulses of neutrons in order to reduce the average power consumed by the generator.

Figure 7:
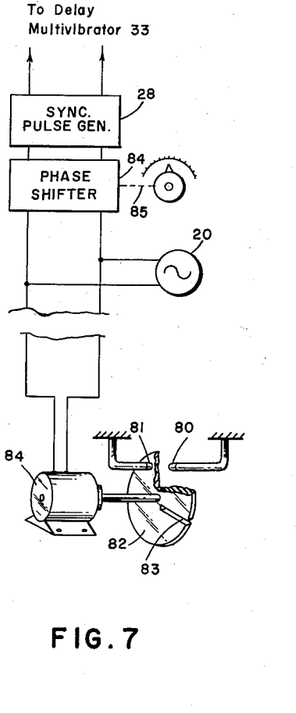
FIG. 7 is a schematic diagram of another modification which may be made in the apparatus of FIG. 1.

A naturally active neutron source may be arranged in a known manner to deliver its neutron output during repetitive intervals. For example, as shown in FIG. 7, a source of alpha particles, such as a pellet 80 of radium, and a target 81, such as beryllium, may be disposed adjacent one another but on opposite sides of a shield disk 82 which may be constructed of aluminum. The shield is provided with a narrow slit 83 and is rotated by a synchronous driving motor 84 energized by alternating current source 20. Accordingly, no neutrons are derived when the target 81 is shielded from the alpha source 80 by the disk 82, but neutrons are derived when alpha particles pass through the slit 83 and react with beryllium off the target. Such neutrons have energies in a range extending to 5 mev. and are capable of interacting with nuclei in the formations in essentially the same manner described hereinbefore.

The width of the slit 83 in the shield disk 82 and the speed of the driving motor 84 (which is synchronous with current alternations of source 20) are selected so as to provide neutron irradiation intervals of the required duration and time-spacing. The detection system may be synchronized with rotation of the shield disk by coupling the output of source 20 to synchronizing pulse generator 28 via a phase shifter 84 or a delay circuit having an adjustment 85. Accordingly, the timing of the detection intervals may be selected according to the teachings of the present invention.

If desired, in methods wherein the observation intervals are spaced from the irradiation intervals, the detector itself may be de-energized during the irradiation intervals. For example, the power to tube 29 in FIG. 1 may be interrupted and thus it may be less effected by the high intensity neutron flux emitted by generator 25.

While particular embodiments of the present invention have been shown and described, it is apparent that changes and modifications may be made without departing from this invention in its broader aspects, and therefore, the aim in the appended claims is to cover all such changes and modifications as fall within the true spirit and scope of this invention.

I claim:

1. A method of exploring earth formations which comprises the steps of: irradiating the formations with neutrons during repetitive, relatively short intervals of time thereby to define successive operating cycles, each including an irradiation interval followed by a quiescent interval, and each such quiescent interval including a first period wherein neutrons may slow down, diffuse and experience capture reactions with nuclei in atoms of the formations as manifested by characteristic nuclear phenomenon, respectively, and a second period wherein radioactive elements formed by neutron interactions may exhibit a product of radioactive decay; and detecting a nuclear phenomenon uniquely characteristic of a selected interaction between said neutrons and the formations only during repetitive, relatively short observation intervals, each occurring within a portion of one of said operating cycles including said irradiation interval and said first period when said nuclear phenomenon would be expected to occur.

2. A method of exploring earth formations which comprises the steps of: irradiating the formations with neutrons during repetitive, relatively short irradiation intervals; and detecting a nuclear phenomenon uniquely characteristic of a selected interaction between said neutrons and the formations only during relatively short observation intervals, each relatively closely related in timing to one of said irradiation intervals, when said nuclear phenomenon would be expected to occur.

3. A method of exploring earth formations which comprises the steps of: irradiating the formations with neutrons during repetitive, relatively short irradiation intervals; and detecting gamma radiation resulting from inelastic scattering of neutrons only during relatively short observation intervals, each relatively closely related in timing to one of said irradiation intervals, when said gamma radiation would be expected to occur.

4. A method of exploring earth formations which comprises the steps of: irradiating the formations with neutrons during repetitive, relatively short irradiation intervals; and detecting gamma radiation of a selected energy resulting from inelastic scattering of neutrons only during relatively short observation intervals, each occurring in a period including one of said irradiation intervals and a successive, relatively short interval, when said gamma radiation would be expected to occur.

5. A method of exploring earth formations which comprises the steps of: irradiating the formations with neutrons during repetitive, relatively short intervals of time thereby to define successive operating cycles, each including an irradiation interval followed by a quiescent interval, and each such quiescent interval including a first period wherein neutrons may slow down, diffuse and experience capture reactions with nuclei in atoms of the formations and a second period wherein radioactive elements formed by neutron interactions may exhibit a product of radioactive decay; and detecting a nuclear phenomenon uniquely characteristic of a selected interaction between said neutrons and the formations only during a portion of said first period, when said phenomenon would be expected to occur.

6. A method of exploring earth formations which comprises the steps of: irradiating the formations with neutrons during repetitive, relatively short intervals of time thereby to define successive operating cycles, each including an irradiation interval followed by a quiescent interval, and each such quiescent interval including a first period wherein neutrons may slow down, diffuse and experience capture reactions with nuclei in atoms of the formations and a second period wherein radioactive elements formed by neutron interactions may exhibit a product of radioactive decay; and obtaining indications of the time within said first period wherein a selected nuclear phenomenon uniquely characterics of a selected interaction between said neutrons and the formations exhibits a maximum effect.

7. A method of exploring earth formations which comprises the steps of: irradiating the formations with neutrons during repetitive, relatively short intervals of time thereby to define successive operating cycles, each including an irradiation interval followed by a quiescent interval, and each such quiescent interval including a first period wherein neutrons may slow down, diffuse and experience capture reactions with nuclei in atoms of the formations and a second period wherein radioactive elements formed by neutron interactions may exhibit a product of radioactive decay; and detecting neutrons having a selected energy corresponding to the energy the resultant flux of neutrons would have as a result of a uniquely characteristic interaction between said radiating neutrons and the formations only during relatively short observation intervals, each included within one of said first periods, when said resultant flux would be expected to occur.

8. A method of exploring earth formations which comprises the steps of: irradiating the formations with neutrons during repetitive, relatively short intervals of time thereby to define successive operating cycles, each including an irradiation interval followed by a quiescent interval, and each such quiescent interval including a first period wherein neutrons may slow down, diffuse and experience capture reactions with nuclei in atoms of the formations and a second period wherein radioactive elements formed by neutron interactions may exhibit a product of radioactive decay; and obtaining indications of the timing relationship of the occurrence of a characteristic of neutrons slowed to thermal energies, relative to said irradiation intervals, and occurring during each of said first periods.

9. A method of exploring earth formations which comprises the steps of: irradiating the formations with neutrons during repetitive, relatively short intervals of time thereby to define successive operating cycles, each including an irradiation interval followed by a quiescent interval, and each such quiescent interval including a first period wherein neutrons may slow down, diffuse and experience capture reactions with nuclei in atoms of the formations and a second period wherein radioactive elements formed by neutron interactions may exhibit a product of radioactive decay; and detecting gamma radiation resulting from neutron capture only during relatively short observation intervals, each occurring within one of said first periods, when said gammma radiation would be expected to occur.

10. A method of exploring earth formations which comprises the steps of: irradiating the formations with neutrons during repetitive, relatively short intervals of time thereby to define successive operating cycles, each including an irradiation interval followed by a quiescent interval, and each such quiescent interval including a first period wherein neutrons may slow down, diffuse and experience capture reactions with nuclei in atoms of the formations and a second period wherein radioactive elements formed by neutron interactions may exhibit a product of radioactive decay; and obtaining indications of the time within said first period wherein gamma radiation resulting from neutron capture is a maximum.

11. A method of exploring earth formations traversed by a borehole which comprises the steps of: irradiating the formations with neutrons during relatively short, time-spaced irradiation intervals to produce atoms having compound nuclei; detecting a selected nuclear phenomenon resulting promptly from such compound nuclei and uniquely characteristic of a specific interaction between said neutrons and the formations only during relatively short detection intervals so timed relative to said irradiation intervals as to exclude detection of effects other than said selected nuclear phenomenon; and obtaining indications of said selected nuclear phenomenon as a function of depth in the borehole.

12. A method of exploring earth formations which comprises the steps of: irradiating the formations with neutrons of relatively high energy capable of effecting inelastic collisions with nuclei of atoms thereby to produce atoms having compound nuclei; and detecting gamma radiation occurring promptly relative to the production of such compound nuclei which is uniquely characteristic of a specific interaction between said neutrons and the formations only during an interval when said gamma radiation would be expected to occur.

13. A method of exploring earth formations which comprises the steps of: irradiating the formations with neutrons of relatively high energy capable of effecting inelastic collisions with nuclei of atoms thereby to produce atoms having compound nuclei; and indicating gamma radiation having a predetermined energy level and occurring promptly relative to the production of such compound nuclei only during a time interval in which said gamma radiation would be expected to occur.

14. A method of exploring earth formations which comprises the steps of: irradiating the formations with neutrons of relatively high energy to produce atoms having compound nuclei through a process wherein those of said neutrons slowed by formation material to thermal energy levels are captured by respective nuclei; and indicating gamma radiation occurring promptly relative to the production of such compound nuclei only during an interval in which said gamma radiation would be expected to occur.

15. A method of exploring earth formations which comprises the steps of: irradiating the formations with neutrons of relatively high energy to produce atoms having compound nuclei through a process wherein those of said neutrons slowed by formation material to thermal energy levels are captured by respective nuclei; and indicating gammma radiation having a predetermined energy level and occurring promptly relative to the production of such compound nuclei only during a time interval in which said gamma radiation would be expected to occur.

16. Apparatus for exploring earth formations traversed by a borehole comprising: a source of neutron pulses; and a detection system including means movable with said source and responsive to a nuclear phenomenon resulting from irradiation of the formations by neutrons, and means coupled to said first-mentioned means for indicating a characteristic of said nuclear phenomenon; and means for selectively operating said detection system substantially only during observation intervals, each occurring within a period including a neutron pulse and terminating prior to the occurrence of a product representing radioactive decay of a radioactive element formed by neutron capture in which said nuclear phenomenon would be expected to occur.

17. Apparatus for investigating earth formations traversed by a borehole comprising: a source of neutron pulses adapted to be passed through the borehole for irradiating the formations with neutrons; an indicator including a viewing screen and means for developing a visible, recurrent trace on said viewing screen in a predetermined synchronous relationship to said neutron pulses, a detector movable with said source through the borehole for deriving a pulse signal representing a nuclear phenomenon resulting from said irradiation which is uniquely characteristic of a specific interaction between said neutrons and the formations; an integrator coupled to said detector for deriving a potential representing the rate of occurrence of the pulses in said signal; and means for applying said potential to said indicator to deflect said trace in accordance with the magnitude of said potential.

18. Apparatus for investigating earth formations traversed by a borehole comprising: a source of neutron pulses adapted to be passed through the borehole for irradiating the formations with neutrons; a detector movable with said source through the borehole for deriving a pulse signal representing a nuclear phenomenon resulting from said irradiation which is uniquely characteristic of a specific interaction between said neutrons and the formation; an integrator coupled to said detector for deriving a potential representing the rate of occurrence of the pulses in said signal; and an automatic tracking circuit operated in a predetermined synchronous relationship with said neutron pulses and coupled to said integrator for continuously indicating the timing relationship of the maximum value of said potential relative to said neutron pulses.

19. A method of testing material which comprises the steps of: irradiating a sample of material with neutrons during a short interval of time to define an irradiation interval, a first period following said interval and terminated by neutron capture reactions with nuclei in atoms of the sample of material, and a second period following said first period wherein radioactive decay products may be exhibited; and obtaining indications of a phenomenon uniquely representative of a specific interaction between said neutrons and the material occurring in the sample of material during an observation interval disposed in time within a period including said irradiation interval and said first perod, to the exclusion of said second period.

20. A method of testing material which comprises the steps of: irradiating a sample of material with neutrons during repetitive, relatively short intervals of time thereby to define successive operating cycles, each including an irradiation interval followed by a quiescent interval, and each such quiescent interval including a first period wherein neutrons may slow down, diffuse and experience capture reactions with nuclei in atoms of the sample of material and a second period wherein radioactive elements formed by neutron interactions may exhibit a product of radioactive decay; and obtaining indications of a nuclear phenomenon uniquely characteristic of a specific interaction between said neutrons and the material occurring in the sample of material during a portion of one of said operating cycles including said irradiation interval and said first period, to the exclusion of said second period.

21. A method of testing material which comprises the steps of: irradiating a sample of material with neutrons during repetitive, relatively short intervals of time thereby to define successive operating cycles, each including an irradiation interval followed by a quiescent interval, and each such quiescent interval including a first period wherein neutrons may slow down, diffuse and experience capture reactions with nuclei in atoms of the sample of material and a second period wherein radioactive elements formed by neutron interactions may exhibit a product of radioactive decay; and obtaining indications of a nuclear phenomenon uniquely characteristic of a specific interaction between said neutrons and the material occurring in the sample of material during an observation interval in a portion of one of said operating cycles including said irradiation interval and said first period, to the exclusion of said second period, when said phenomenon would be expected to occur, said observation interval having a relatively short duration compared to said first period.

22. A method of testing material which comprises the steps of: irradiating a sample of material with neutrons during a short interval of time to define an irradiation interval, a first period following said interval and terminated by neutron capture reactions with nuclei in atoms of the sample of material, and a second period following said first period wherein radioactive decay products may be exhibited; and obtaining indications of the timing relation between a reference point in time and an observation interval wherein a selected nuclear phenomenon uniquely representative of a selected interaction between said neutrons and the material occurs, said observation interval being within a period including said irradiation interval and said first period, to the exclusion of said second period.

23. A method of testing material which comprises the steps of: irradiating a sample of material with neutrons during a short interval of time to define an irradiation interval, a first period following said interval and terminated by neutron capture reactions with nuclei in atoms of the sample of material, and a second period following said first period wherein radioactive decay products may be exhibited; and obtaining indications of the timing relation between a reference point in time and an observation interval wherein neutrons slowed to a predetermined energy by the sample of material arrive at an observation point, said observation interval being within a period, including said irradiation interval and said first period, to the exclusion of said second period.

24. A method of exploring earth formations which comprises the steps of: irradiating the formations with neutrons to produce atoms having compound nuclei as evidenced by the occurrence within a given interval of time relative to irradiation of the formations of a characteristic prompt nuclear phenomenon, and detecting said phenomenon only during said interval to the exclusion of similar nuclear phenomena resulting from said irradiation of the formations and occurring outside of said interval.

References Cited in the file of this patent

UNITED STATES PATENTS

| 2,275,748 | Fearon | Mar. 10, 1942 |
| 2,303,688 | Fearon | Dec. 1, 1942 |
| 2,712,081 | Fearon et al. | June 28, 1955 |

Notice of Adverse Decision in Interference

In Interference No. 93,812 involving Patent No. 2,991,364, C. Goodman, WELL LOGGING, final judgment adverse to the patentee was rendered June 25, 1965, as to claims 1, 2, 3, 4, 5, 6, 7, 8, 9, 10, 11, 12, 13, 14, 15, 16, 19, 20, 21, 22, 23 and 24.

[*Official Gazette September 28, 1965.*]